United States Patent [19]

Weiler et al.

[11] Patent Number: 4,492,081
[45] Date of Patent: Jan. 8, 1985

[54] LOW PRESSURE CASING FOR A BRAKE BOOSTER

[75] Inventors: Rolf Weiler, Sindlingen; Peter Boehm, Frankfurt am Main; Lucas H. Haar, Niddatal; Karlheinz Timtner, Bad Homburg, all of Fed. Rep. of Germany

[73] Assignee: ITT Industries, Inc., New York, N.Y.

[21] Appl. No.: 591,895

[22] Filed: Mar. 21, 1984

Related U.S. Application Data

[63] Continuation of Ser. No. 291,550, Aug. 10, 1981, abandoned.

[30] Foreign Application Priority Data

Aug. 19, 1980 [DE] Fed. Rep. of Germany ....... 3031206

[51] Int. Cl.³ .................................................. F01B 19/02
[52] U.S. Cl. ..................................... 60/547.1; 92/169
[58] Field of Search .......... 91/369 A; 92/98 R, 98 D, 92/99, 169, 169.2; 220/72, 74, 71, 73, 85 B; 60/547.1

[56] References Cited

U.S. PATENT DOCUMENTS

| 1,420,463 | 6/1922 | Tolman | 270/73 |
|---|---|---|---|
| 1,964,029 | 6/1934 | Brackenbury | 220/74 |
| 2,185,216 | 1/1940 | McManus et al. | 270/74 |
| 2,686,610 | 8/1954 | Sharpnack, Sr. | 220/73 |
| 2,972,983 | 2/1961 | Ayers, Jr. | 92/99 |
| 3,120,296 | 2/1964 | Randol | . |
| 3,246,394 | 4/1966 | Meyer | 220/71 |
| 3,349,952 | 10/1967 | Bijvoet | 220/73 |
| 4,353,291 | 10/1982 | Hauduc | 92/99 |
| 4,445,331 | 5/1984 | Weiler et al. | 60/547.1 |

FOREIGN PATENT DOCUMENTS

| 1294958 | 4/1962 | France | 92/99 |
|---|---|---|---|
| 88472 | 8/1978 | Japan | 92/169 |

Primary Examiner—Robert E. Garrett
Assistant Examiner—Richard S. Meyer
Attorney, Agent, or Firm—James B. Raden; Edward J. Brosius

[57] ABSTRACT

A low-pressure casing for a brake booster for automotive vehicles comprising two casing shells. A central ring flange is located at the inner surface of the end wall of each of the two casing shells. The portion of each end wall lying outside the ring flange is of truncated-cone-shaped construction and merges into a cylindrical circumferential casing section. At each of these merger points, a prop ring is inserted to bear against the inner surface of the associated one of the two casing shells.

4 Claims, 19 Drawing Figures

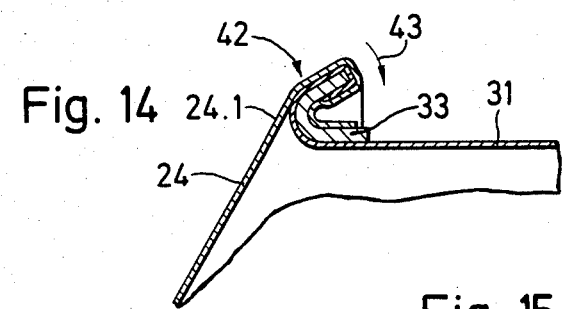
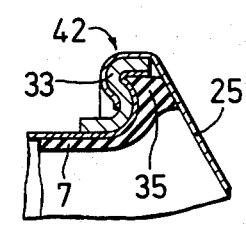
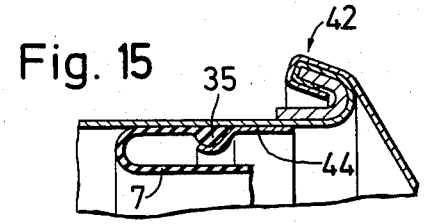
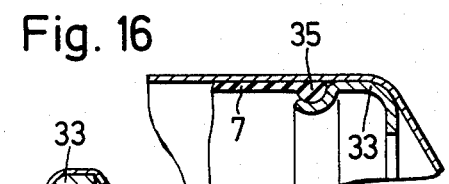
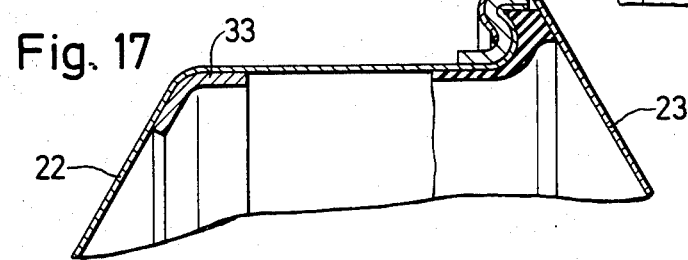
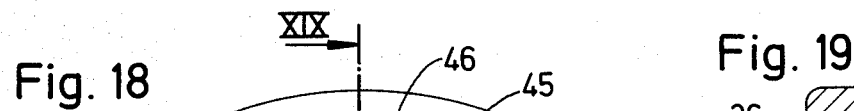
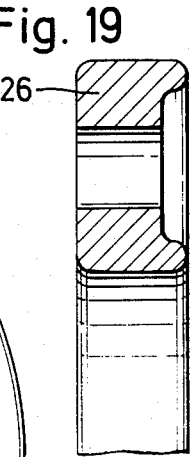

LOW PRESSURE CASING FOR A BRAKE BOOSTER

This specification is a continuation of application Ser. No. 291,550, filed Aug. 10, 1981 and now abandoned.

BACKGROUND OF THE INVENTION

The present invention relates to a low-pressure casing for a brake booster for use in automotive vehicles comprising two casing shells sealingly interconnected, one of the two casing shells having a casing end wall close to the master cylinder, the other of the two casing shells having a casing end wall close to the brake pedal and each of the two casing shells having a substantially cylindrical circumferential casing section extending to the area of interconnection; and an axially movable wall sealingly subdividing the low-pressure casing into a low-pressure chamber and a working chamber.

In low-pressure brake boosters for automotive vehicles, the master brake cylinder is fitted to one casing end wall of the low-pressure casing, while the other end wall is fastened to the automotive vehicle, preferably to the splashboard. The brake forces which are transmitted onto the actuating piston of the master brake cylinder when braking will have to be re-transmitted as reaction forces from the master brake cylinder onto the point where the brake booster is fastened to the automotive vehicle. Taking into consideration that these comparatively high tractive forces take their course via the low-pressure casing, the low-pressure casing has so far been constructed with comparatively thick walls, which acts adversely to a generally desired reduction of the brake booster's weight.

A substantial reduction in weight by employing a thin-walled low-pressure casing construction may be achieved by having the tractive forces transmitted via separate tie elements which interconnect the two casing end walls, for instance, tie bolts as disclosed in German Patent DE-OS No. 2,845,794, or a central reinforcement tube, as disclosed in U.S. copending application of J. Belart and F. Wienecke, Ser. No. 061,113, filed July 26, 1979, assigned to the same assignee as the present application. In any case, the sealing of the axially movavle wall at the points where these tie elements extend therethrough necessitates additional structural arrangements and represents a possible source of failure.

SUMMARY OF THE INVENTION

It is, therefore, an object of the present invention to provide a low-pressure casing of the type referred to hereinabove, having a thin-walled and for this reason light-weight construction and a sufficient amount of rigidity to transmit the forces occurring, without the usable casing interior being impaired by force-transmitting elements, such as tie bolts, or a central reinforcement tube.

A feature of the present invention is the provision of a low-pressure casing for a brake booster comprising: an axially movable wall sealingly subdividing the casing into a low-pressure chamber and a working chamber; two casing shells sealingly interconnected, one of the two casing shells having a first end wall adjacent the low-pressure chamber disposed coaxial of and transverse to a longitudinal axis of the casing and the other of the two casing shells having a second end wall adjacent the working chamber disposed coaxial of and transverse to the axis, the first end wall having a first central ring flange disposed against an inner surface thereof coaxial of the axis, the first flange having master cylinder connecting means, the second end wall having a second central ring flange disposed against an inner surface thereof coaxial of the axis, the second flange having means to connect the booster to an automotive means, each of the first and second end walls including a first portion lying radially outside the associated one of the first and second flanges having a truncated cone configuration and a second portion merging into the first portion, the second portion being a cylindrical casing portion coaxial of the axis; and a prop ring disposed inside each of the two casing shells bearing against the inner surface thereof at an area where the first and second portions merge.

In conventional low-pressure casings which are used to transmit forces, the casing end walls are subjected to bending strain, which has a comparatively large amount of expansion as a result and, thus, necessitates comparatively thick walls. On the other hand, in the low-pressure casing constructed in accordance with the present invention the casing end walls are basically subjected to tensile load. If the ring flange is of small construction, it will also be only subjected mainly to tensile load. The tension forces occurring in the direction of the surface lines of the truncated-cone-shaped portion of the casing end wall will be converted at the circumferential casing edges into a tensile load acting on the cylindrical circumferential casing section, with a radial and tangential pressure load being applied to the prop rings disposed in these points. Thereby, only tensile and pressure loads will basically still occur in the entire low-pressure casing, but no more bending strain. Because the amount of expansion is considerably reduced under tensile and pressure loads, the wall thickness of the casing may be chosen comparatively small without the transmission of forces being impaired.

Since there is no need for providing force-transmitting elements in the casing interior, the operation of the parts of the brake booster which are disposed in the casing interior will not be impaired. The previous manufacturing technology will be maintained to a great extent, and the simple and proven operational elements of the brake booster may be used without being altered. There are no additional sealing problems, since there are no passages at the movable wall to be sealed.

Low-cost raw materials may be employed, such as sheet steel, gray cast iron, or, under certain circumstances, rolled steel strip for the ring flanges and the prop rings. This accomplishes a light-weight construction of the brake booster by utilizing conventional materials without employing expensive raw materials, such as a light metal.

Suitably, the prop rings are inserted radially prestressed at the inner side of the circumferential casing edges. In this way the prop rings are suitable to a certain degree to absorb the radial pressure forces occurring.

The prop rings can be brought into an adhesive engagement, preferably welded, with the casing shells. On account of this type of connection, neither the casing nor the prop rings are weakened.

In a further embodiment of the present invention, the truncated-cone-shaped portions of the end walls are reinforced by depressions extending substantially radially. The reinforcement of the thin-walled casing end wall obtained by these depressions has favorable effects under these operating conditions in which the casing end wall is temporarily exposed to pressure load. Besides, the depressions are able to be used in an advantagious manner to form abutment surfaces for each inwardly angled section of the prop rings, which simplifies the axial fixation and, under certain circumstances, the fastening of the prop rings.

To increase the prop rings' resistance to compression, despite a minor demand in material, it has proved particularly expedient to arrange for a circumferential cavity in the area of the circumferential casing edge, so that a closed hollow carrier member is established there which is able to receive a high amount of pressure load even in the event of a small wall thickness without incurring the danger of buckling. This circumferential cavity may be formed between the prop ring and the casing shell. It is, however, also possible to manufacture the prop ring of two profiled sheet metal strips which are connected at their longitudinal edges and between which the circumferential cavity is provided in the intermediate area.

In addition to the inner prop ring, an outer reinforcement ring may be arranged at the circumferential casing edge for further reinforcement.

In another embodiment of the present invention which is particularly suitable with regard to manufacture, the prop ring is constructed as a slotted ring having ring end portions which overlap each other and are welded to each other. These prop rings can be rolled from strip material. The prop rings can without difficulty be inserted into the casing shells and urged into abutment therewith with the desired preload, before they are connected to the casing shells and closed at their overlapping ends. The welding of the prop rings is carried out preferably by roller-spotwelding or projection welding.

If a curl-up engagement is chosen to connect the thin-walled casing parts, in an improvement of the present invention, the prop ring is inserted into this curl-up engagement between the end wall and the cylindrical casing section, thereby obviating the need for a separate fastening means for the prop ring.

When the curl-up engagement is of a sufficiently stable construction, the beaded parts of the curl-up engagement themselves are able to form the prop ring. This results in a simplification of manufacture.

In case a rolling diaphragm is provided for sealing the movable wall to the casing, a simple fastening means for the rolling diaphragm is obtained at the casing by providing an anchor groove between the prop ring and the casing shells for a bead of the rolling diaphragm.

Since the transmission of forces from the ring flange onto the sheet metal of the casing end wall is desired to take place evenly along the periphery, but the introduction of force into the ring flange generally takes place at two fastening screws only, a particular light-weight construction of the ring flange is obtained by the ring flange including reinforcement webs extending from the fastening screws, so that the rigidity of the ring flange decreases starting from the fastening screws towards the other points along the periphery.

In a construction of the connection between the end wall and the ring flange which is particularly suitable for the transmission of the tension forces, yet at the same time provides ease of manufacture and a specially light weight, the ring flanges include at their outside a groove having engaged therein an inner edge of the casing end wall which encompasses a ring.

When mentioning two ring flanges and two prop rings for a low-pressure casing, it has been assumed that in general the two casing end walls are of similar construction as regards the transmission of forces. It is understood, however, that the casing construction in accordance with the present invention is also permitted to be arranged in the area of the one casing end wall solely, while the other casing end wall is constructed in a manner which principally differs therefrom, in particular in case this is conditioned by other circumstances of construction.

BRIEF DESCRIPTION OF THE DRAWING

Above-mentioned and other features and objects of this invention will become more apparent by reference to the following description taken in conjunction with the accompanying drawing, in which:

FIGS. 11-17 are partial cross sectional views of further embodiments of the low-pressure casing of FIG. 1;

FIG. 18 is a partial end view of a ring flange; and

FIG. 19 is a cross sectional view taken along the line XIX—XIX in FIG. 18.

DESCRIPTION OF THE PREFERRED EMBODIMENTS

Figure 1:
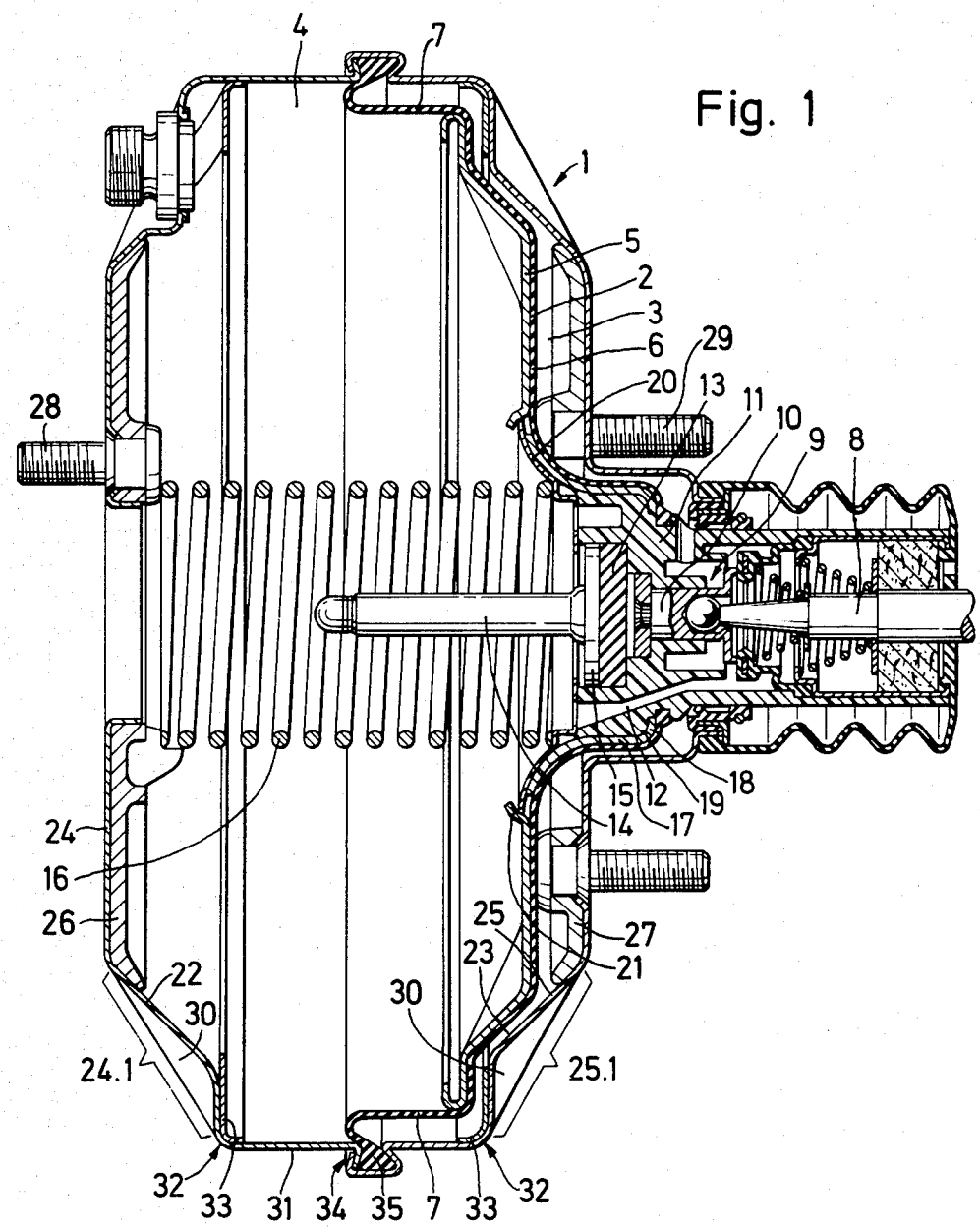
FIG. 1 is a longitudinal cross sectional view of a brake booster in accordance with the principles of the present invention, with the sectional plane being angled in the longitudinal axis.

The brake booster shown in FIG. 1 includes a low-pressure casing 1 which is subdivided into a working chamber 3 and a low-pressure chamber 4 by an axially movable wall 2. The axially movable wall 2 is composed of a sheet-metal deep-drawn diaphragm plate 5 and a flexible diaphragm 6 abutting thereon and forming a rolling diaphragm 7 as a seal between the outer circumference of diaphrgam plate 5 and low-pressure casing 1.

A control valve 9 actuatable by a piston rod 8 has a control valve piston 10 which is connected to the piston rod 8 and which opens valve openings in a control valve housing 11 in such a manner that working chamber 3 communicates in the inactive position shown in FIG. 1 with low-pressure chamber 4 via air channels 12 which extend laterally in control valve housing 11 and which have their outlet at the periphery of the end face of control valve housing 11. Actuation of control valve 9, i.e. axial displacement of piston rod 8 by the action of a brake pedal will interrupt the connection between lowpressure chamber 4 and working chamber 3. Working chamber 3 will be connected to atmosphere so that movable wall 2 moves towards low-pressure chamber 4.

The braking force will be transmitted onto an actuating piston of a non-illustrated master cylinder of the brake unit fastened to the end of the brake booster close to low-pressure chamber 4 via a reaction disc 13 of elastic rubber which is accommodated in an indentation in the end face of control valve housing 11, and a pushrod 14, which incorporates a top flange 15. A compression spring 16 maintains the movable wall in the initial position shown.

Diaphragm plate 5 includes a cup-shaped hub member 17, from which a holding flange 18 extends radially inwardly and abuts at a shoulder 19 of control valve housing 11. A retaining plate 20 made of sheet metal is fixed at diaphragm plate 5 by means of tongues 21 punched out of diaphragm plate 5 and bears against the end face of control valve housing 11.

Low-pressure casing 1 comprises two casing shells 22 and 23 made of a comparatively thin sheet metal. Each of casing shells 22 and 23 has an end wall 24 and 25, respectively, and ring flanges 26 and 27 abutting the inner surfaces of end walls 24 and 25, respectively. Ring flanges 26 and 27 have fastening screws 28 and 29, respectively, for connection with the master brake cylinder and with the splashboard of the automotive vehicle, respectively.

The portions 24.1 and 25.1 of the end walls 24 and 25, respectively which lies radially outside ring flanges 26 and 27, respectively, are shaped like a truncated cone and includes radial depressions 30. Prop rings 33 are inserted at the inner surface of the circumferential casing edges 32 at the transition from truncated-cone-shaped portions 24.1 and 25.1 of the end walls into a cylindrical circumferential casing section 31.

The junction 34 of the two casing shells 22 and 23 is situated in the cylindrical circumferential casing section 31. The beaded edges of the two casing shells are hooked in each other there. A bead 35 of rolling diaphragm 7 is received in a circumferential groove.

Figure 2:
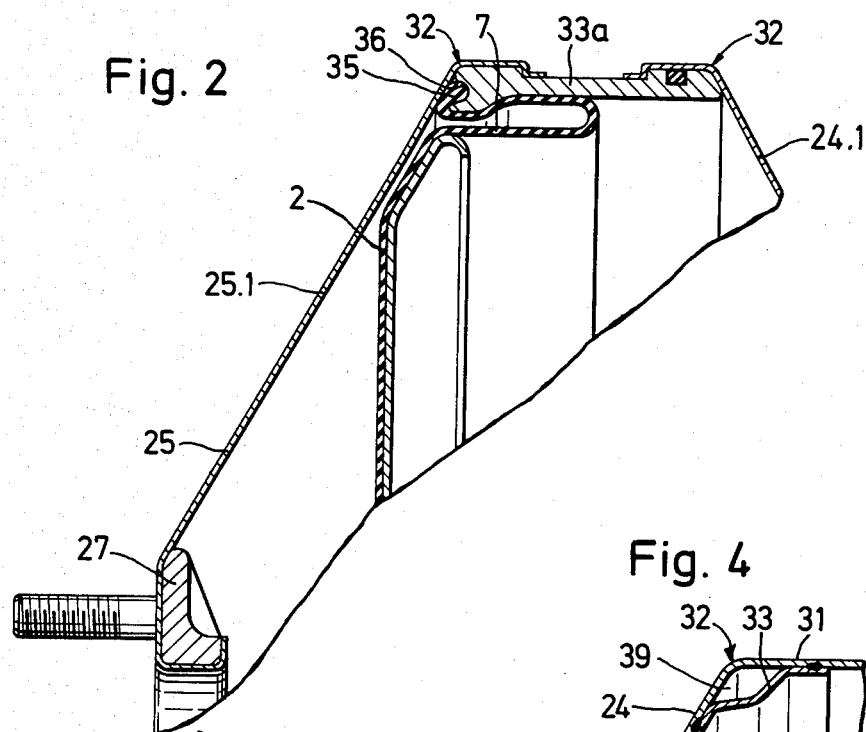
FIGS. 2-9 are partial cross sectional views of various embodiments of the low-pressure casing of FIG. 1.

FIG. 2 shows an embodiment of a low-pressure casing wherein ring flange 27 is of a comparatively small construction. There are no depressions provided in the truncated-cone-shaped portions 25.1 and 24.1 of end walls 25 and 24.

The prop rings inserted inwardly at the circumferential casing edges 32 are assembled to establish the ring 33a which forms the cylindrical circumferential casing section and at whose outer side the edges of the two casing shells are fixed by being curled up.

Arranged on one side between ring 33a and casing end wall 25 is an anchor groove 36 in which bead 35 of rolling diaphragm 7 is held.

Figure 3:
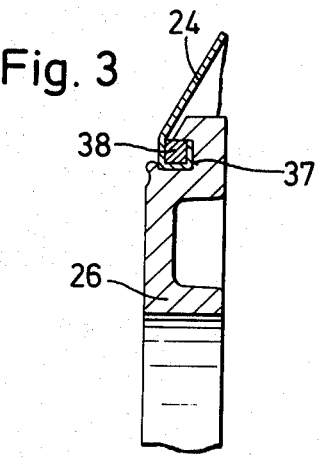

While in the embodiments according to FIGS. 1 and 2, the sheet metal of end walls 24 and 25 is put around ring flanges 26 and 27 at the outside and in the bore, FIG. 3 shows a different fastening method for the end wall. In this arrangement, ring flange 26 includes a groove 37 in its outer surface engaged in which is an inward edge of casing end wall 24 which is laid around a ring 38.

Figure 4:
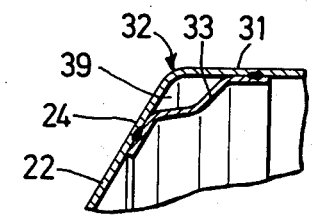

In the embodiment according to FIG. 4, prop ring 33 is profiled so as to form a circumferential cavity 39 in the area of circumferential casing edge 32 between prop ring 33 and casing shell 22.

Figure 5:
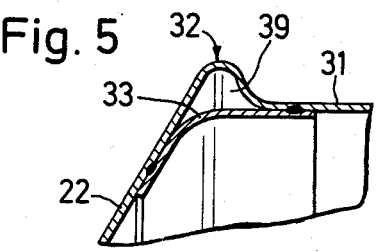

A cavity 39 or the like may also be obtained as shown in FIG. 5 where casing shell 22 forms an outwardly curved bead in the area of circumferential casing edge 32. The prop ring 33 disposed in the interior of the casing is only slightly curved in this case.

In the embodiments according to FIGS. 4 and 5, the two longitudinal edges of prop ring 33 are welded with end wall 22 and with cylincrical circumferential casing section 31.

Figure 6:
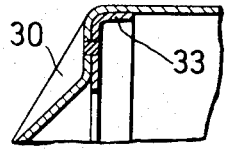

FIG. 6 shows an embodiment similar to the one in FIG. 1, with prop ring 33, which is angled when viewing the crosssection, being welded solely with the radially extending sections of depressions 30.

Figure 7:
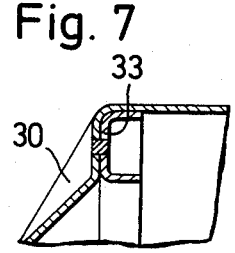

Similarly, prop ring 33 according to FIG. 7 is welded with depressions 30. For further reinforcement, prop ring 33 has a U-shaped cross-sectional profile.

Figure 8:
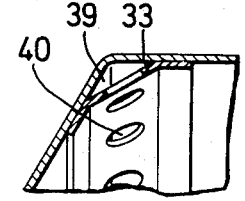

The embodiment according to FIG. 8 is similar to the embodiment according to FIG. 4, but includes bores 40 in prop ring 33 which serve to save weight and to afford the possibility of lacquering cavity 39.

Figure 9:
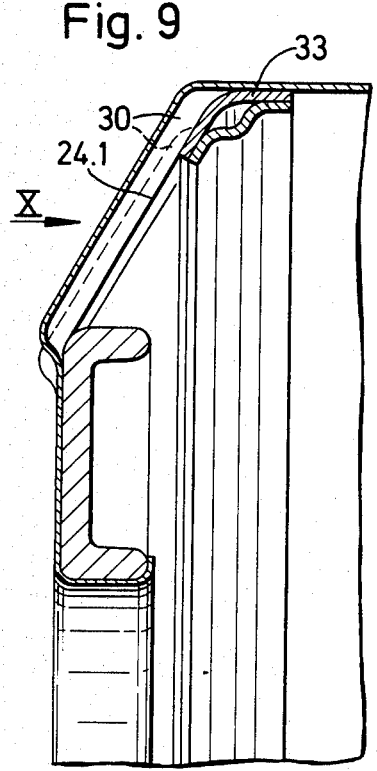
Figure 10:
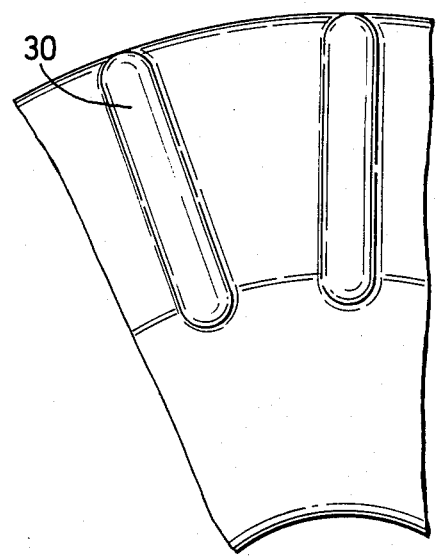
FIG. 10 is a partial end view in the direction of the arrow X in FIG. 9.

FIGS. 9 and 10 show an embodiment of the radial depressions 30 which is modified with respect to FIG. 1. Depressions 30 are curved standing out of the truncated-cone surface of end wall portion 24.1 so that prop ring 33 abuts directly at the truncated-cone-shaped end wall portion 24.1.

Figure 11:
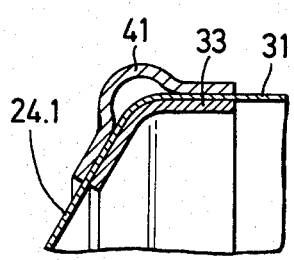

As is shown in FIG. 11, a further reinforcement ring 41 can be fitted at the outer surface of circumferential casing edge 32 in addition to prop ring 33.

Figure 12:
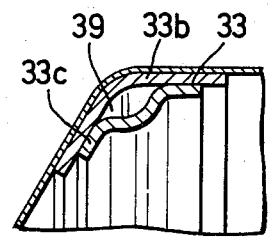

FIG. 12 shows a bipartite construction of prop ring 33 comprising two parts 33b and 33c which are connected to one another and between which cavity 39 is formed.

Figure 13:
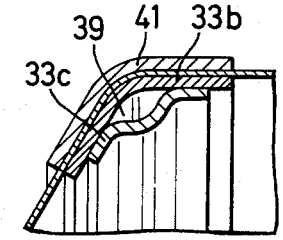

FIG. 13 shows a combination of the embodiments according to FIGS. 11 and 12. A prop ring composed of the parts 33b and 33c is located at the inner surface of the casing shell 24 and a reinforcement ring 41 is fitted additionally at the outer surface of casing shell 24.

In the embodiment according to FIG. 14, the prop rings 33 are each inserted into a curl-up engagement 42 between casing end walls 24 and 25 and the cylindrical circumferential casing section 31. In the case of the curl-up engagement illustrated on the left-hand side when viewing FIG. 14, prop ring 33 is first of all connected to the circumferential casing section 31. Afterwards, the truncated-cone-shaped end wall portion 24.1 will be likewise folded around the prop ring 33, and this connection will then be once more squeezed together, as is indicated by an arrow 43, so that the sheetmetal edges of the casing parts contribute to the reinforcement and form together with prop ring 33 a comparatively rigid ring.

Bead 35 of rolling diaphragm 7 has to be fastened to the other circumferential casing edge 32. In the embodiment according to FIG. 14, bead 35 is received between the curl-up engagement 42 and the casing end wall 25.

FIG. 15 shows a variation of FIG. 14, wherein a separate holding strip 44 for bead 35 is fitted to the inner surface of the casing.

In the embodiment according to FIG. 16, prop ring 33 inserted at the inner surface of the casing simultaneously forms the holding mechanism for bead 35.

FIG. 17 shows an embodiment which provides particular ease of manufacture. Since low-pressure casing 1 is required to be of a bipartite construction, i.e., is composed of two casing shells 22 and 23, one casing shell 22 is manufactured as a cup with conical bottom and cylindrical circumferential wall. Prop ring 33 is made oversized and pressed in the casing. At the other circumferential casing edge, prop ring 33 forms part of a curl-up engagement in the manner described before.

FIGS. 18 and 19 show a ring flange 26 which has an eye 45 with a bore 46 to accommodate a fastening screw 28. Webs 47 extend like beams from eye 45 to the edges of ring flange 26 each having a bead. This achieves a special reinforcement in the area of the fastening screw, while there is more elasticity of the ring flange in the remaining areas.

Preferably, ring flanges 26 and 27 are constructed such that the ring flange will not be turned up or distorted by the forces acting on it.

While we have described above the principles of our invention in connection with specific apparatus, it is to be clearly understood that this description is made only by way of example and not as a limitation to the scope of our invention as set forth in the objects thereof and in the accompanying claims.

We claim:

1. A low-pressure casing of thin-walled construction for a brake booster comprising:

an axially movable wall sealingly subdividing said casing into a low-pressure chamber and a working chamber;

two thin-walled casing shells sealingly interconnected to form said casing, one of said tow casing shells having a first end wall adjacent said low-pressure chamber disposed coaxial of and transverse to a longitudinal axis of said casing and the other of said two casing shells having a second end wall adjacent said working chamber disposed coaxial of and transverse to said axis, said first end wall having a first central reinforced ring flange disposed against an inner surface thereof coaxial of said axis, said first flange having at least one threaded mounting member integral to said flange for connection to a master cylinder, said second end wall having a second central ring flange disposed against an inner surface thereof coaxial of said axis, said second flange having threaded means integral thereto and extending through said second wall to connect said booster to an automotive means, each of said first and second end walls including a first portion lying radially outside the associated one of said first and second flanges having a truncated cone configuration and a second portion merging into said first portion along a circumferential merging or transition area, said second portion being an outer cylindrical casing portion coaxial of said axis; and a separate prop ring mounted and secured inside each of said two casing shells bearing against the inner surface thereof both said portions to bear against and reinforce both said first and second portions on both sides of the trantition area.

2. A casing according to claim 1, wherein each of said prop rings are radially prestressed when positioned to bear against the inner surface of the respective one of said two casing shells.

3. A casing according to claims 1 or 2, wherein each of said prop rings is in an adhesive engagement with the inner surface of an associated one of said two casing shells.

4. A casing according to claims 1 or 2, wherein each of said prop rings is welded to the inner surface of an associated one of said two casing shells.

* * * * *